(12) United States Patent
Tabraham (10) Patent No.: US 7,769,776 B2
(45) Date of Patent: Aug. 3, 2010

(54) SYSTEM AND METHODOLOGY PROVIDING IMPROVED INFORMATION RETRIEVAL

(75) Inventor: John Tabraham, Leatherhead (GB)

(73) Assignee: Sybase, Inc., Dublin, CA (US)

( * ) Notice: Subject to any disclaimer, the term of this patent is extended or adjusted under 35 U.S.C. 154(b) by 614 days.

(21) Appl. No.: 11/309,082

(22) Filed: Jun. 16, 2006

(65) Prior Publication Data

US 2007/0294220 A1    Dec. 20, 2007

(51) Int. Cl.
G06F 7/00    (2006.01)

(52) U.S. Cl. .................................................. 707/770

(58) Field of Classification Search .................. 707/3, 707/770
See application file for complete search history.

(56) References Cited

U.S. PATENT DOCUMENTS

| | | | | |
|---|---|---|---|---|
| 5,694,593 A | * | 12/1997 | Baclawski | 707/5 |
| 5,933,837 A | * | 8/1999 | Kung | 1/1 |
| 6,023,694 A | * | 2/2000 | Kouchi et al. | 1/1 |
| 6,366,915 B1 | * | 4/2002 | Rubert et al. | 1/1 |
| 6,415,301 B1 | * | 7/2002 | Takahashi | 1/1 |
| 6,523,028 B1 | * | 2/2003 | DiDomizio et al. | 1/1 |
| 2002/0095399 A1 | * | 7/2002 | Devine et al. | 707/1 |
| 2005/0108200 A1 | * | 5/2005 | Meik et al. | 707/3 |

OTHER PUBLICATIONS

Sybase, Inc., "OmniQ Enterprise Edition 3.0—Reference Manual", Dec. 2005, Sybase, 82 pages.*
Sybase, Inc., "Installation Guide and Release Bulletin, OmniQ 3.0 Enterprise Edition for Windows 2000, 2003, and XP", Nov. 2005, Sybase, 12 pages.*
Callan, Jamie., "Distributed Information Retrieval", 2000, Carnegie Mellon University, 24 pages.*

* cited by examiner

Primary Examiner—Don Wong
Assistant Examiner—Michael Le
(74) Attorney, Agent, or Firm—John A. Smart (57) ABSTRACT

System and methodology for performing Bayesian-based distributed query processing is provided that solves the problem of how to get each server participating in a Bayesian distributed search system to return the same accurate relevance score for different documents. By performing calculations in a two-step process, accurate Bayesian calculation results are obtained whilst distributing the document indexing and query processing.

30 Claims, 7 Drawing Sheets

SYSTEM AND METHODOLOGY PROVIDING IMPROVED INFORMATION RETRIEVAL

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to information retrieval and, more specifically, to a system providing improved methodologies for performing information retrieval using Bayesian technique.

2. Description of the Background Art

The World Wide Web (or "Web") contains a vast amount of information in the form of hyper-linked documents (e.g., web pages) loosely-organized and accessed through the "Internet." The vast majority of the information includes hyperlink "shortcuts" to other information located in other hyperlinked documents. The unstructured nature and sheer volume of data available via the Internet makes it difficult to navigate efficiently through related information while avoiding irrelevant information.

To cope with the vast information available, users often employ a computerized search engine to sort through the large quantity of information accessible via data networks such as the Internet. Here, the user simply provides the search engine with a search request or query—that is, a set of one or more search terms for the desired topic. In response, the search engine typically performs a text-based search and returns the most relevant information located. Search engines typically return results as a list of web sites, sorted by relevance to the user's search terms. For example, Google™ and Yahoo™ search engines display search result pages that list links associated with the located web pages, together with a brief description of the content provided by the web pages.

As the Web continues to grow, the goal of providing highly relevant search results in real-time becomes increasingly important. One approach to improving search engine performance is to distribute the query (and associated work) among multiple machines. A distributed query is one in which the query may access underlying base data from multiple network locations; various distributed query models exist today. For simple keyword information retrieval (IR) systems, such as Boolean IR systems where documents either match or they do not, there are a number of architectures for distributing the indexed data and the query processing.

The simplest model is Central Data, Central Query Processing. Here, all document indexing and query processing is done on a central server. However, the solution is not scalable and therefore is not a viable approach for use in a next generation search engine. A slightly more complicated model is Remote Data, Central Query Processing. In this model, document indexing and data storage is done remotely, whilst all the data needed for the query processing is transported across the network from each remote server to the central server. However, this solution is no longer viable, as it suffers from excessive network traffic. As more and more data is indexed, more and more calculation data is required to be sent over the network to the central processing server. For example, if 10 remote servers each contained 500,000 documents, there could be over 5 million integers being passed to the central server for each term in the query. For 10 query terms, this is 50 million integers. If each integer requires at least three bytes (e.g., to account for more than 65,536 documents), then each query is using a staggering 143 MB of memory. Remote Data, Remote Query Processing attempts to improve upon that approach by performing both the document indexing and query processing remotely. The lists of matching documents are combined on a central server before being returned to the user. However, the model is only possible when the local query processing is unaffected by remote query processing being performed on other servers.

Apart from architectural considerations (i.e., central versus distributed), different information retrieval strategies are available, including keyword searching, Bayesian searching, and linguistic-based searching. Today, most enterprise-level searches utilize either keyword searching or Bayesian searching. The main difference between the two is that with keyword searching one may calculate the search results independently of other considerations. With Bayesian searching, on the other hand, a knowledge of the environment (e.g., number of documents indexed throughout an entire system) is required. This difference is perhaps best illustrated by way of example.

Consider, for instance, a Boolean keyword search for documents containing the word "Java," where a first machine contains 100 matches and a second machine contains 200 matches. Here, the number of matches on the first machine (i.e., 100 matches) is independent of what is happening on any other machine. Thus in this simple example of a distributed Boolean search, there is no problem with indexing and searching of documents that exist on many remote machines (e.g., servers). Therefore, with that architecture (i.e., Boolean keyword searching), one may employ a central hub together with many remote servers, each performing its own independent indexing (i.e., independent of the other servers). When a query is performed, each remote server can simply returned its own local results (i.e., yes/no for individual documents) to the central hub, which may in turn simply tabulate a list of top results (i.e., by simple combination of the local results of each remote server). Importantly, with a simple Boolean keyword search there is no problem with a distributed type of search, as each local result can be computed independently.

With a Bayesian search, in contrast, searching is performed in a manner that relies on all the information that is gathered about all the servers. Consider, for instance, a query for "Java" where a first machine has 100 documents 10 of which contain "Java", and a second machine has 200 documents 50 of which contain "Java." With a Bayesian calculation, instead of simply returning a yes or no match (for the given query), the system actually attempts to determine the relevance as well (i.e., how well the documents match). The calculation that determines how well a document matches needs to know not only how important the search term (e.g., "Java") is on the current machine (e.g., first machine) but also how important the search term is on all the other machines where there are documents indexed (e.g., second machine and so forth). In particular, the Bayesian calculation relies on giving each term in a given query its own term weighting. The term weighting can in fact change over time, as more documents are indexed. Also, each individual server can have an affect on the overall term weighting.

Today, existing solutions do not solve the problem of how to get each server participating in a Bayesian distributed search system to return the same accurate relevance score for different documents. In order to achieve enterprise-level scalability, it is necessary to distribute both document indexing and query processing on separate servers. Given that, a problem remains as to how the local results (i.e., matching documents) come back with a correct score from each server.

The current best solution tries to estimate how accurate each individual server's calculation is likely to be. For example, if a first server has 100 documents indexed and a second server has 1,000,000 documents indexed, the current best solution assumes that the server that has the most data indexed (i.e., the second one, which has the larger number of documents indexed) is going to be more correct. The reason that this can be done is that with the Bayesian calculation, the larger the sample size the more accurate the result. Therefore, the current best solution does not try to alter the calculations on individual servers, but instead tries to scale all of the results coming back from the various servers. With this approach, each server is effectively given a particular weighting (i.e., scaling factor). Unfortunately, the results obtained by applying a scaling factor leave a lot to be desired.

The basic problem is that the approach is too raw. Given a lot of documents on one server and a lot of documents on another server, if for some reason the scaling factor is less than completely accurate (e.g., due to insufficient data), then all the documents from one server are inaccurately scaled, in effect, tarring all of the documents with the same brush. For example, suppose 100 documents are returned from a particular server but because of scaling the results from that server are not trusted, so the score for every one of those documents is reduced by 50%. It may turn out, however, that the top documents (e.g., top 10) from that particular server could have a very good score. Therefore, the approach of applying a global scaling factor may incorrectly reduce the score of documents that in fact are highly relevant matches (i.e., should have a good score). In effect, good scores are lumped in with the bad scores. All told, the approach is very temperamental, depending very much on documents that are indexed on servers. The approach does not take into account documents indexed on other servers to a fine enough granularity.

Most distributed IR systems do not use Bayesian statistics to produce lists of matching documents, and therefore do not suffer from the foregoing distributed query calculation problem. However at the same time, an approach based on Bayesian technique is likely to provide more relevant results—that is, results that are more pertinent to the user's task at hand. What is needed is a system incorporating methodologies for performing Bayesian-based information retrieval, but doing so in a manner that avoids the distributed query calculation problem. The present invention fulfills this and other needs.

SUMMARY OF INVENTION

System and methodology providing improved information retrieval are described. In one embodiment, for example, in a computer system that comprises a central server and one or more remote servers, an improved method of the present invention is described for performing distributed query processing, the method comprises steps of: receiving at the central server a search request specifying one or more terms for retrieving documents; at each remote server where documents have been indexed, generating partial Bayes calculation data for each term on that server; at the central server, generating global Bayes calculation data by combining the partial Bayes calculation data from each remote server; sending the global Bayes calculation data to each remote server as part of the distributed query processing; at each remote server, producing a list of matching documents sorted by relevance ranking by performing a local Bayesian query calculation based at least in part on the global Bayes calculation data; and at the central server, generating a final list of most relevant documents by merging the lists of matching relevant documents from each remote server.

In another embodiment, for example, an information retrieval system of the present invention is described that comprises: a central hub and one or more remote document stores; a module, operating at the central hub, for receiving a search request specifying one or more terms for retrieving documents; a module, operating at remote document stores, for generating partial Bayes calculation data for each term for documents indexed at that module; a module, operating at the central hub, for generating global Bayes calculation data by combining the partial Bayes calculation data from each remote document store, and sending the global Bayes calculation data back to each remote document store; a module, operating at remote document stores, for producing a list of matching documents sorted by relevance ranking by performing a local Bayesian query calculation based at least in part on the global Bayes calculation data at each remote document store; and a module, operating at the central hub, for generating a final list of most relevant documents by merging the lists of matching relevant documents from each remote document store.

In yet another embodiment, for example, an improved method of the present invention is described for performing distributed Bayesian query processing, the method comprises steps of: receiving at a first computer a search request for retrieving documents pursuant to one or more search terms; based on the search request, sending a lightweight request to other computers where documents have been indexed, for determining partial Bayes calculation data for each term on each of the other computers; at the first computer generating global Bayes calculation data by combining the partial Bayes calculation data from each of the other computers; sending the global Bayes calculation data to each of the other computers as part of the distributed Bayesian query processing; at each of the other computers, producing a list of matching documents sorted by relevance ranking by performing a local Bayesian query calculation that takes into account the global Bayes calculation data; and at the first computer, generating a final list of most relevant documents by merging the lists of matching relevant documents from each of the other computers.

DETAILED DESCRIPTION

Glossary

The following definitions and abbreviations are offered for purposes of illustration, not limitation, in order to assist with understanding the discussion that follows.

Bayesian Statistics: A branch of statistics that deals with the probability of events based on information about past events.

IR: Information Retrieval.

OmniQ™: The search technology based on a Bayesian probability calculation engine of the present invention.

OmniQ™ Enterprise: The distributed IR system based on Sybase OmniQ technology (Sybase, Inc. of Dublin, Calif.).

Module: Each OmniQ Module performs a single task or operation, such as indexing documents or performing query calculations.

Container: Each OmniQ Container runs a user-specified number of OmniQ Modules, such as the File System Import Module and Delegate Query Module. Typically, a client would run each Container on a separate server for maximum performance.

Hub: The central OmniQ Container which co-ordinates the other OmniQ Containers. The Hub contains the central Query Module and is the access point for the whole system.

N: The total number of documents indexed by OmniQ Enterprise. For example, if OmniQ indexes 1000 documents successfully, N=1000.

n: The global term frequency of each term indexed. For example, if the word "java" appears 5 times in each of 50 documents, n=250.

ttf: The total term frequency of each term. For example, if the term "Java" appears in one document 7 times and another document 8 times, ttf=15.

wdf: The term frequency of each term within each document indexed. For example, if the term "java" appears in a document 7 times, wdf=7.

DL: The document length, which is defined as the total number of unique terms in a document. For example "java sql java sql server" contains three unique terms. Note that the document length defined here should not be confused with either the size of the document on disk, nor the total word count.

L: The average document length, defined as the sum of all DLs divided by N.

termId: The unique integer ID assigned by OmniQ Enterprise to each term acquired during document indexing.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows™ operating system. The present invention, however, is not limited to any one particular application or any particular environment. Instead, those skilled in the art will find that the system and methods of the present invention may be advantageously embodied on a variety of different platforms, including Macintosh™, Linux™, Solaris™, UNIX™, FreeBSD™, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

Figure 1:
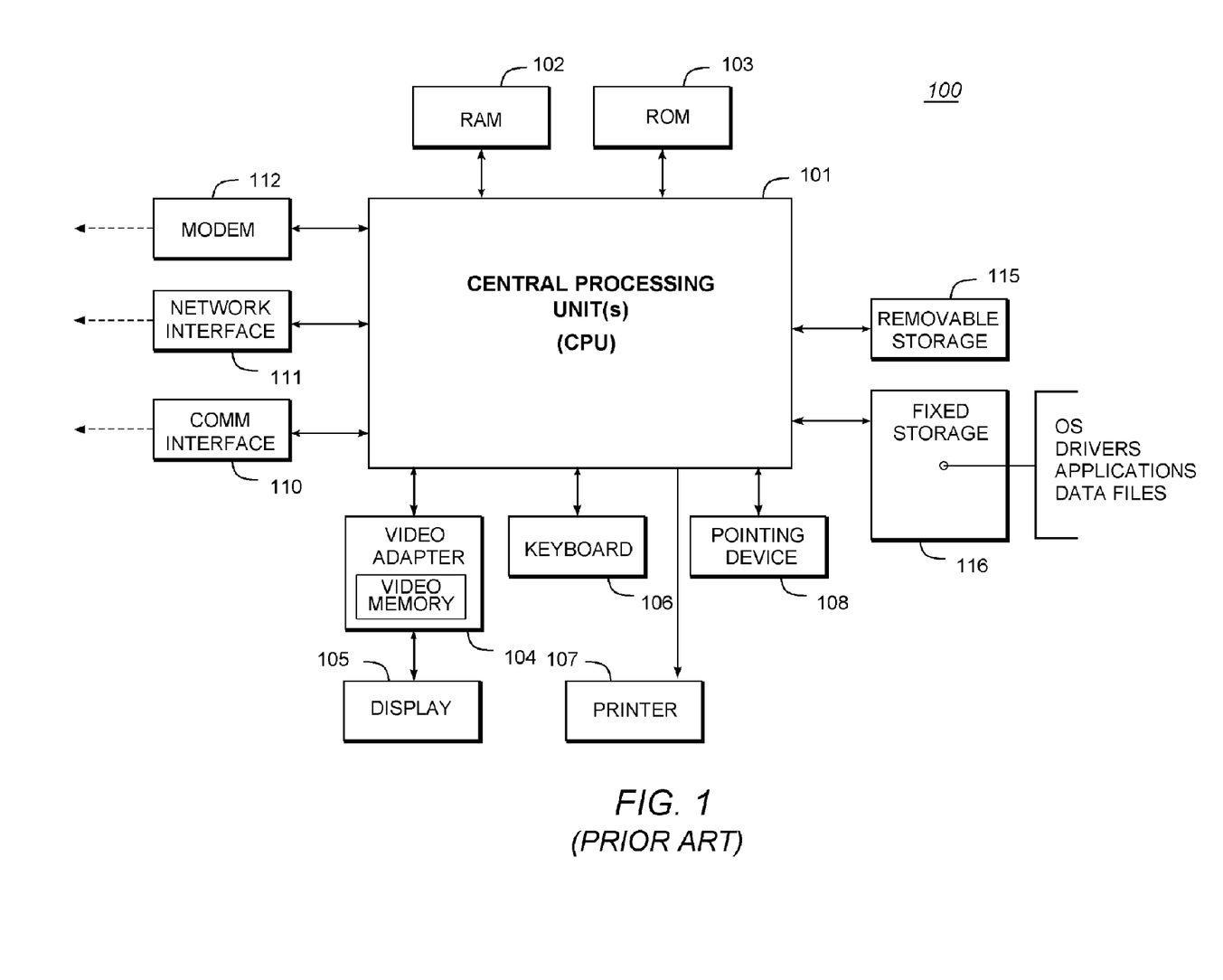
FIG. 1 is a very general block diagram of a computer system (e.g., an IBM-compatible system) in which software-implemented processes of the present invention may be embodied.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel™ Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows™ NT, Microsoft Windows™ 2000, Microsoft Windows™ XP, or Microsoft Windows™ Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying desktop and server computer components that may be employed for implementing the present invention. For purposes of discussion, the following description will present examples in which it will be assumed that there exists one computer (e.g., a "server") that communicates with one or more other computers, including "clients" (e.g., desktop computers) as well as other servers. The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

OmniQ™ Enterprise, the commercial embodiment of the present invention, is a distributed IR system that uses Bayesian statistics to calculate the most relevant matching documents to a user's query. After documents have been indexed, a user enters a natural language text query and is provided with a list of matching documents ranked in relevance order. Each document's relevance is calculated by an OmniQ Enterprise Bayesian engine.

OmniQ Enterprise provides scalability by allowing clients to index documents on different servers, thus distributing the indexing load. Document indexing itself is performed by Satellite Containers. Each Container runs on a separate server for maximum performance and handles the local storage of the query calculation data obtained during indexing. Each Satellite Container also contains one or more Bayesian calculation engines for performing local query processing. For processing the distributed query results and returning the global combined query results, the system includes a central Hub Container running a Query Module. The architecture and operation of OmniQ Enterprise will now be described in further detail.

System Components

Figure 2:
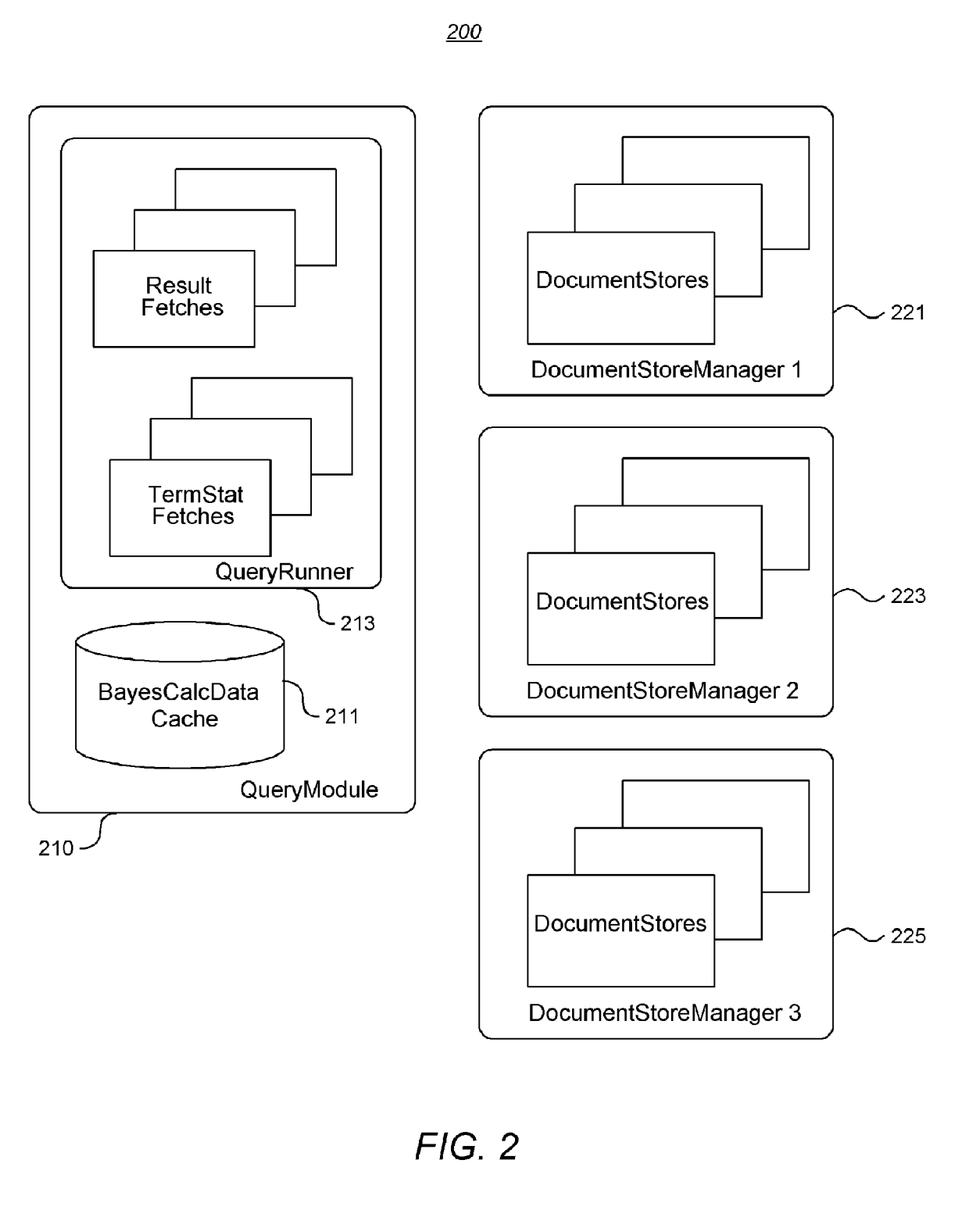
FIG. 2 is a block diagram illustrating a distributed IR (Information Retrieval) system constructed in accordance with the present invention.

FIG. 2 is a block diagram illustrating a distributed IR system 200 constructed in accordance with the present invention. The left side of the diagram illustrates query processing server components that typically run on a central hub. The right side of the diagram illustrates document store server components they typically run on servers at individual remote locations. The system 200 includes connectivity to clients or other systems (not shown) that submit queries for documents of interest.

The query module 210 (QueryModule) is a special module. It contains the core engine (logic) for the system, and also includes a cache module 211 as shown. In an ideal setting, the query module 210 is located on a central server that manages the connections to all of the other servers. This central server is essentially a hub that all of the other servers are connected to, in a hub and spokes (wheel) arrangement. Technically, although the query module 210 could run on any server, it preferably runs on the hub server for optimum performance. (Otherwise, it is required to make additional network calls.) Therefore, in the currently preferred embodiment, the query module 210 can always be assumed to be running on a central hub server.

The query runner 213 (QueryRunner), which resides within the query module, manages an array of result fetches and an array of term stat fetches. These fetches make calls across the network to document store manager(s) (e.g., document store managers 223, 225, 227) residing at remote servers, for purposes of gathering information back to the hub. In the currently preferred embodiment, the term stat fetches run first. These are very lightweight calls, with very little information required to be exchanged over the network (thereby allowing very fast operation). The data returned from the term stat fetches is cached within the cache 211 of the query module 210. This caching mechanism is an optimization that allows the system to decrease or eliminate subsequent network calls for processing a new query that shares one or more terms in common with a prior-executed query. Once the term stat information has been acquired, the information may be combined in the query module 210.

Under control of the result fetch threads, this combined data (i.e., term stat data), along with the query, is then passed back out to the same document store managers. The difference is as follows. Whereas the term stat fetch essentially fetches a very lightweight/small (information) object, the result fetch instead fetches a full list of results from each document store manager (e.g., document store managers 223, 225, 227). Once these results have been fetched, the query module 210 may combine those results into one final (answer) set, for returning to the user. Here, the various scores (i.e., relevancy) are interleaved into a final sorted set.

In the currently preferred embodiment, every fetch runs as a separate thread, essentially responsible for contacting every other remote server. Here, every fetch asks the hub for the location of every document store manager available for contact. Upon receiving this information, a given fetch may proceed to contact every document store manager via the hub (container). The hub in turn passes the fetch information on to remote containers. Each remote container passes the information on to any document store manager contained within it. The remote containers manage network calls for the document store managers, including monitoring an appropriate communication port for connecting to the hub server. Each document store manager, upon receiving a call from its container, passes the call on to its respective local document store(s).

With this design, each document store manager only has to look after its own document stores. Each document store manager and its corresponding document stores are located together in the same Container and therefore do not incur any network calls. Whilst it is possible to run more than one document store manager on a given server, in a typical set up, there would be just one document store manager per remote server.

Query Calculation

In essence, the Bayesian query calculation asks "what are the chances that this query text has come from this document?" By using the OmniQ data structures to store the raw calculation data, the Bayesian engine avoids having to analyze each document in turn. Due to the way the Bayesian calculation works, indexing more documents gives the engine more information to work with, and so leads to more accurate document relevance scores. (Bayesian calculation being performed using only part of the indexed data may lead to incorrect results, as the values for N, n, ttf, wdf, DL and L would be altered.)

In a single-server system, all the raw calculation data can be made available to a central Bayesian calculation engine. However, in a distributed system, the majority of the calculation data (n, ttf, wdf and DL) is not stored on the central Hub server.

Distributed Query Calculation Problem

The system constructed in accordance with the present invention solves the distributed query calculation problem. In order to understand this feature, it is helpful to briefly review the problem, which may be stated as follows:

How to Perform Accurate Bayesian Calculations Without Having to Store All the Indexed Data Centrally (which Defeats the Purpose of Distributing the Indexing for Scalability)?

Simply performing a sub-set of the calculations on each remote server and then combining the results on the central Hub is not a viable solution, as each document's relevancy score depends on the local Bayesian engine knowing about the global statistics. If the local Bayesian engine does perform its calculation using only the local data, then each document's relevancy score will not be on the same "scale" as one calculated on another remote server. The resulting merged list of results from all remote servers in this case will be incorrect.

By way of example, the problem above can be illustrated using a simple single-word query. The general principal applies to multi-word queries also. Assume one has two document stores, say A and B, each running on a different Satellite Container, where document store A contains 1000 documents and document store B contains 100 documents. The word "Java" appears once in each of 990 documents from store A and once in each of 10 documents from store B.

Part of the Bayesian query calculations uses a term weighting which depends on the ratio:

$$wdf \times (N-n)/n$$

(Refer to the Glossary section for the definition of individual terms.)

In the example, wdf=1 for all documents. If the scores were calculated using "local" values only, one would calculate the following:

N=1000, n=990 giving the ratio as: (1000−990)/990=0.01      A N=100, n=10 giving the ratio as: (100−10)10=9.00      B Simply combining any two sets of results from document stores A and B would lead to a huge discrepancy in their document relevancy scores, as their weightings for the word "java" differ by a huge factor. This is because in document store A, the word "Java" is common (as in, it is present in 99% of documents), so is deemed less relevant to the overall document score. However, in document store B, the word "java" is much rarer (present in only 10% of documents), so contributes more towards each document's relevancy score.

The exact scoring should use the combined data from both document stores A and B. In this combined case, one has:

N=1100, n=1000 giving the ratio as: 100/1000=0.1      A&B

Phrased differently, the distributed query calculation problem is:

How to Perform Local Bayesian Calculations so that they Take into Account the Global Statistics for the Term Data?

The discussion which follows presents methodology of the present invention for solving this problem.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Figure 3A:
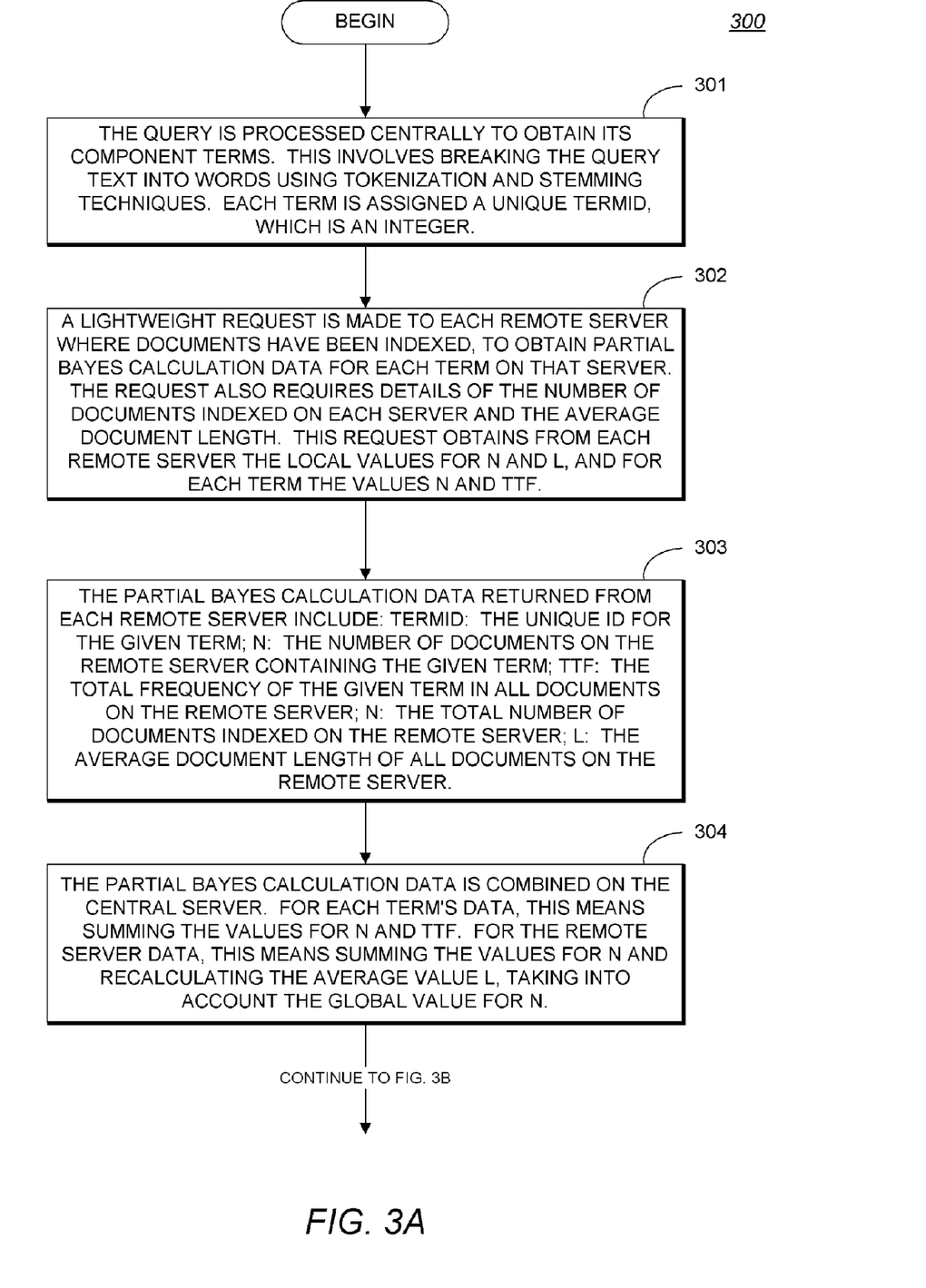
FIGS. 3A-B comprise a single flowchart illustrating the full query processing methodology of the present invention.
Figure 3B:
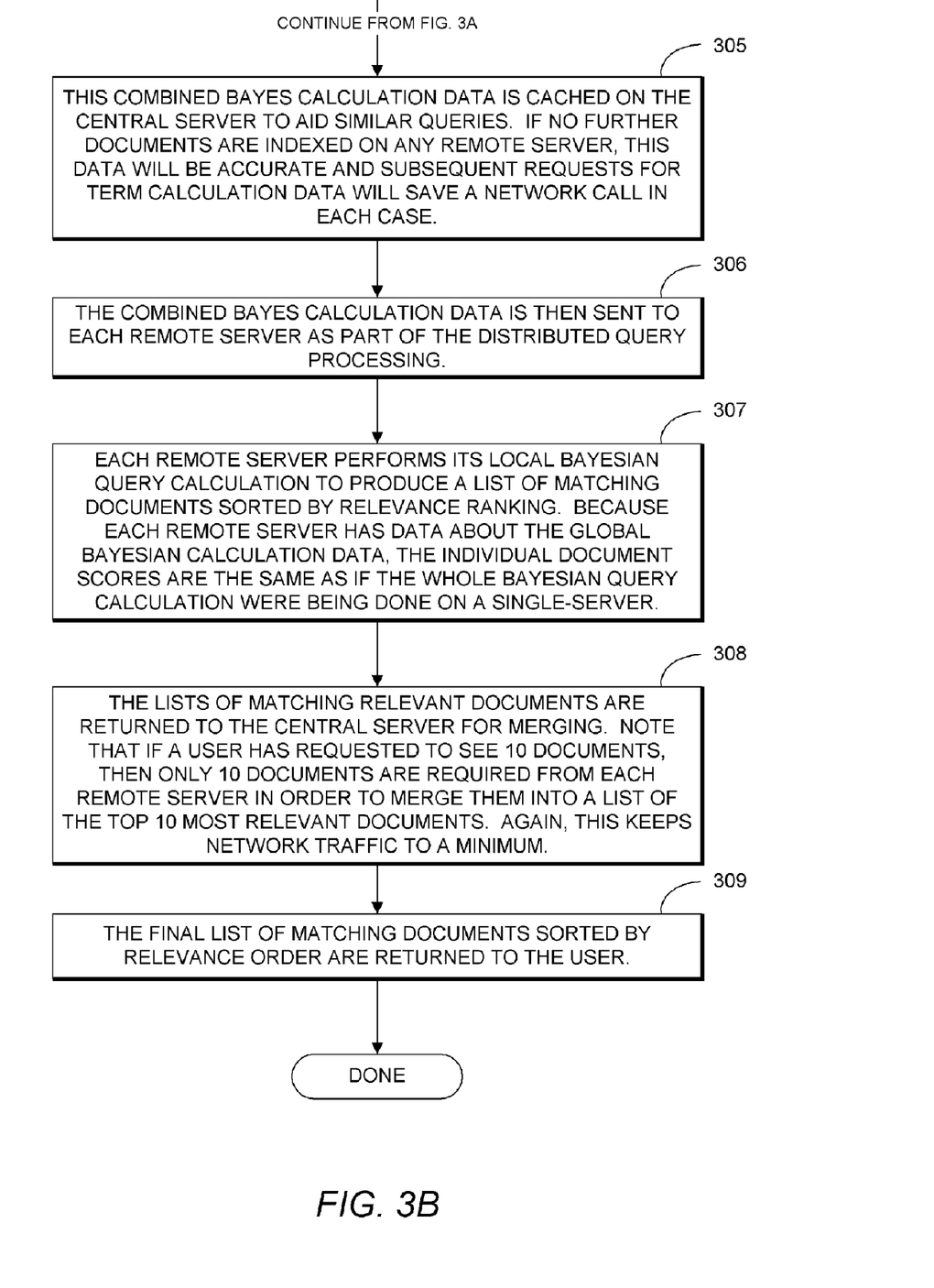

The solution to the problem of providing accurate Bayesian calculation results whilst distributing the document indexing and query processing is to perform the calculations in a two-step process. FIGS. 3A-B comprise a single flowchart illustrating the full query processing methodology of the present invention.

Step 1 (301):

The query is processed centrally to obtain its component terms. This involves breaking the query text into words using tokenization and stemming techniques. Each term is assigned a unique termId, which is an integer.

Step 2 (302):

A lightweight request is made to each remote server where documents have been indexed, to obtain partial Bayes calculation data for each term on that server. The request also requires details of the number of documents indexed on each server and the average document length. This request obtains from each remote server the local values for N and L, and for each term the values n and ttf.

Step 3 (303):

The partial Bayes calculation data returned from each remote server include:

termId: the unique id for the given term n: the number of documents on the remote server containing the given term ttf: the total frequency of the given term in all documents on the remote server N: the total number of documents indexed on the remote server L: the average document length of all documents on the remote server The memory required to store this data for each term is four integers and one float (single precision), totaling 20 bytes. Each Bayes calculation data object is therefore guaranteed a tiny memory footprint and uses very little network bandwidth between the remote and central server.

Step 4 (304):

The partial Bayes calculation data is combined on the central server. For each term's data, this means summing the values for n and ttf. For the remote server data, this means summing the values for N and recalculating the average value L, taking into account the global value for N.

Step 5 (305):

This combined Bayes calculation data is cached on the central server to aid similar queries. If no further documents are indexed on any remote server, this data will be accurate and subsequent requests for term calculation data will save a network call in each case.

Step 6 (306):

The combined Bayes calculation data is then sent to each remote server as part of the distributed query processing.

Step 7 (307):

Each remote server performs its local Bayesian query calculation to produce a list of matching documents sorted by relevance ranking. Because each remote server has data about the global Bayesian calculation data, the individual document scores are the same as if the whole Bayesian query calculation were being done on a single-server.

Step 8 (308):

The lists of matching relevant documents are returned to the central server for merging. Note that if a user has requested to see 10 documents, then only 10 documents are required from each remote server in order to merge them into a list of the top 10 most relevant documents. Again, this keeps network traffic to a minimum.

Step 9 (309):

The final list of matching documents sorted by relevance order are returned to the user.

Phases of Operation

Figure 4:
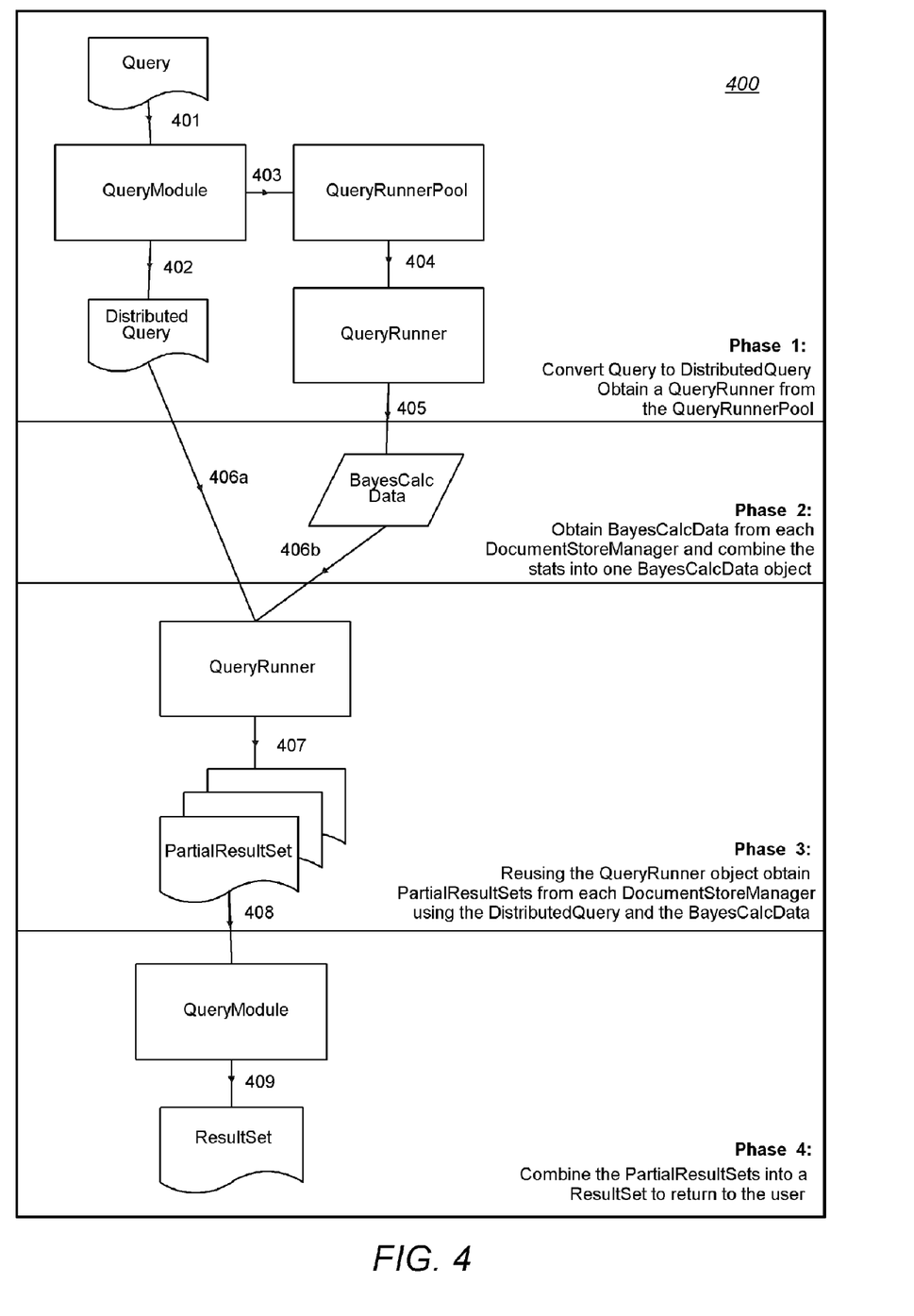
FIG. 4 is a flow diagram illustrating a methodology of the present invention for determining result sets.

FIG. 4 is a flow diagram illustrating a methodology 400 of the present invention for determining result sets. The diagram demonstrates how the Java objects shown in FIG. 2 interact with each other. The methodology proceeds as follows.

Step 401:

The Query is passed to the QueryModule for processing.

Step 402:

The QueryModule converts the Query into a DistributedQuery, which is a lightweight, internal object that can be transported over a network quickly.

Step 403:

The QueryModule requests a QueryRunner from the QueryRunnerPool.

Step 404:

The QueryRunnerPool releases a QueryRunner from the pool.

Step 405:

The QueryModule first checks the BayesCalculationData cache and can re-use data if required. If the BayesCalculationData information is not in the cache, the QueryModule uses the QueryRunner to obtain BayesCalculationData from each DocumentStoreManager in the system and combines the data into a single BayesCalculationData for use in the query calculations. The BayesCalculationData is added to the cache.

Step 406:

The DistributedQuery and global BayesCalculationData are passed to the QueryRunner to run the query on each DocumentStoreManager specified by the user.

Step 407:

Each DocumentStoreManager performs a local query calculation to find the most relevant matching documents using the DistributedQuery and global BayesCalculationData in the query calculations. The relevant matching documents are returned to the QueryRunner over the network as a PartialResultSet.

Step 408:

The array of PartialResultSets, one from each DocumentStoreManager specified, are returned to the QueryModule.

Step 409:

The PartialResultSets are converted into a single ResultSet where additional information, such as paragraph text for the documents, are added. The ResultSet is returned to the process that passed the Query to the QueryModule in Step 401 above.

Figure 5:
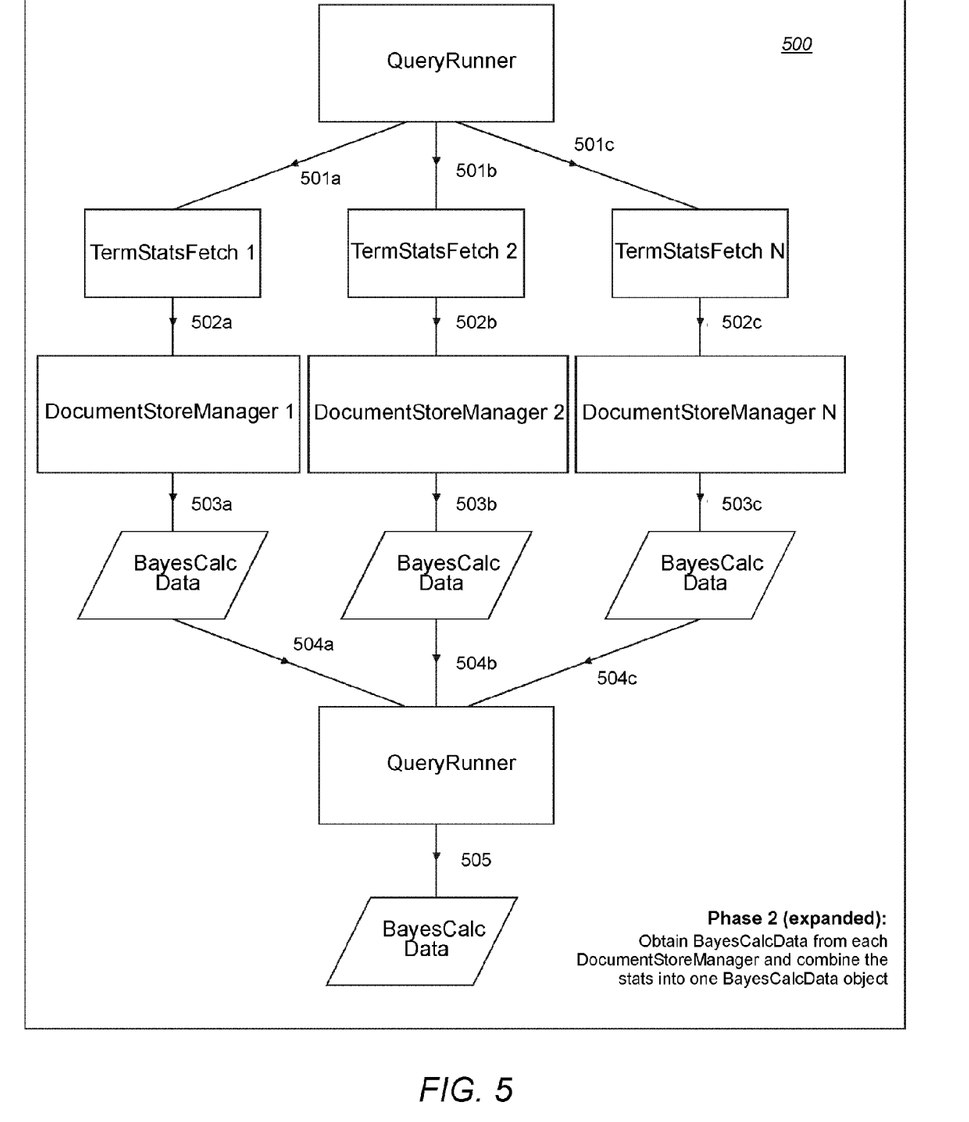
FIG. 5 is an expanded flow diagram for the method step of converting a Query into a DistributedQuery.

FIG. 5 is an expanded flow diagram for step 402 of the distributed query calculation, which illustrates a methodology 500 of the present invention that operates when the required BayesCalculationData is not present in the cache. The following expands step 402 above, where the required BayesCalculationData is not present in the QueryModule's BayesCalculationData cache. The process steps are as follows.

Step 501:

The QueryRunner runs a number of execution threads, one for each DocumentStoreManager. Each thread runs a TermStatsFetch process.

Step 502:

Each TermStatsFetch makes a network call to obtains partial Bayes calculation data for each term in the query for that DocumentStoreManager.

Step 503:

Each DocumentStoreManager obtains partial Bayes calculation data from every DocumentStore managed by that DocumentStoreManager. The data from each DocumentStore is combined on each DocumentStoreManager into one BayesCalculationData object.

Step 504:

The BayesCalculationData is returned from each DocumentStoreManager across the network to the QueryRunner Step 505:

The QueryRunner combines the BayesCalculationData from each DocumentStoreManager into a single BayesCalculationData for use within the distributed query calculation.

Figure 6:
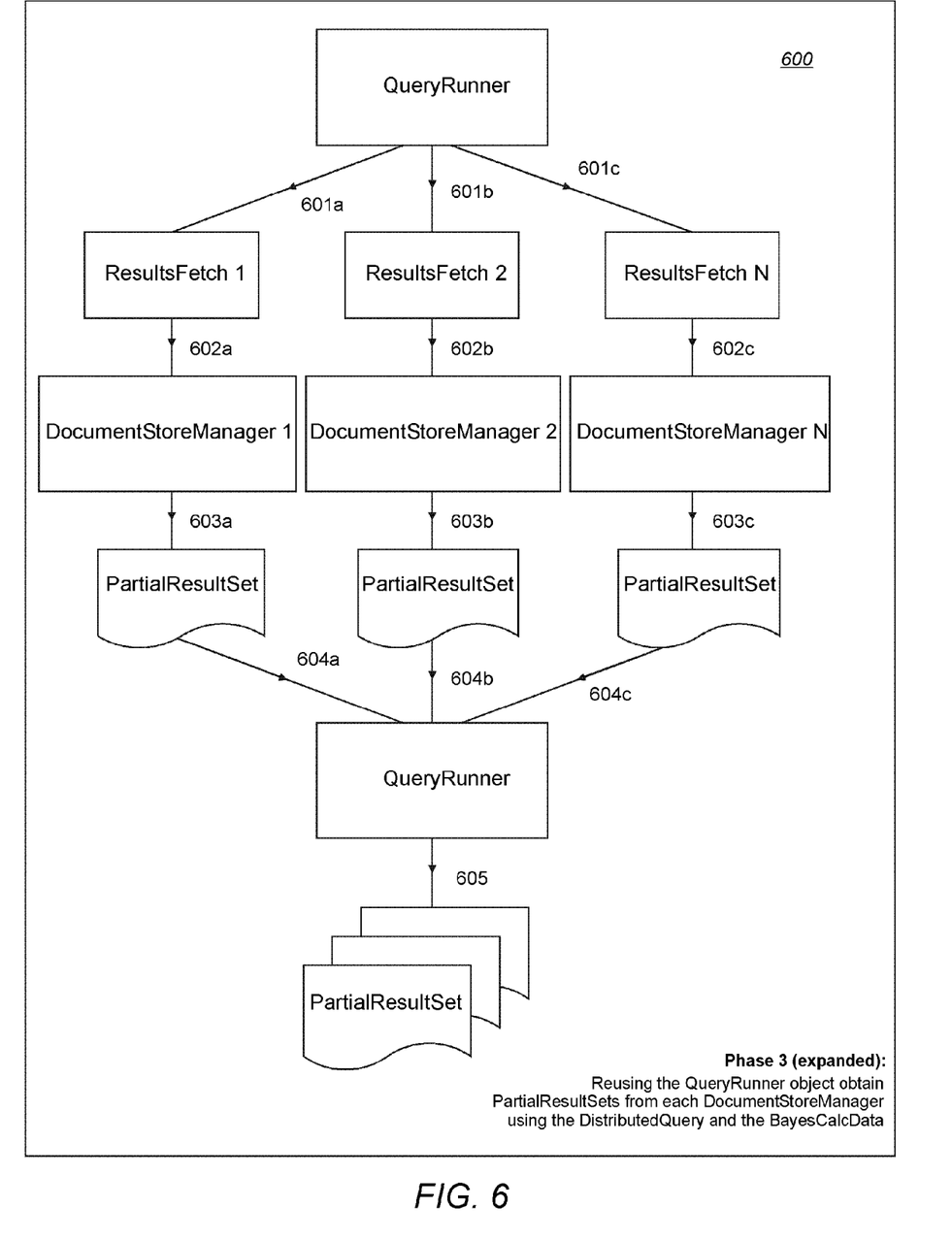
FIG. 6 is an expanded flow diagram for the method step of combining data from each DocumentStore into one BayesCalculationData object.

FIG. 6 presents an expanded flow diagram for step 503 of the distributed query calculation. Specifically, the diagram shown expands step 503 as follows.

Step 601:

The QueryRunner runs a number of execution threads, one for each DocumentStoreManager where the query is to be run, as specified by the user. Each thread runs a ResultsFetch process.

Step 602:

Each ResultsFetch makes a network call to a DocumentStoreManager and passed both the DistributedQuery and the global BayesCalculationData to assist in the query calculations.

Step 603:

Each DocumentStoreManager passes the DistributedQuery and global BayesCalculationData to each DocumentStore (managed by that DocumentStoreManager) that has been selected by the user to run the query. Each DocumentStore performs a local Bayesian query calculation and uses the global BayesCalculationData object to ensure the results are accurate. The result of the calculations is to produce a PartialResultSet for each DocumentStore which are combined into a single PartialResultSet for all the DocumentStores on each DocumentStoreManager.

Step 604:

The PartialResultSet is returned from each DocumentStoreManager across the network to the QueryRunner.

Step 605:

The QueryRunner combines the PartialResultSets into one array and returns the PartialResultSet array back to the QueryModule.

Source Code Implementation

The Java pseudo-code below summarizes key methods and processes used in the flow diagrams above.

```
1: //-----------------------------------------------------------------
2: // The QueryModule's executeQuery method is the main method for
3: // turning user's queries into results of matching documents.
4: // The QueryModule contains the cache of BayesCalculationData
5: // objects.
6: //-----------------------------------------------------------------
7: QueryModule:executeQuery
8: {
9:     // Create the DistributedQuery (termIds) from the Query (terms)
10:    // and the DocumentStores where the query is to be run
11:    DistributedQuery distributedQuery = new DistributedQuery(
12:        query,
13:        documentStoreIds
14:    );
15:
16:    // get a QueryRunner from the pool of QueryRunners
17:    QueryRunner queryRunner = queryRunnerPool.checkOut( );
18:
19:    // Obtain the BayesCalculationsData using the DistributedQuery
20:    // and ALL the DocumentStoreManagerIds, to ensure the
21:    // BayesCalculationsData is global data (see below for the
22:    // expanded method "queryRunner.getBayesCalculationsData")
23:    BayesCalculationsData bayesCalculationsData =
24:        queryRunner.getBayesCalculationsData(
25:            distributedQuery,
26:            allDocumentStoreManagerIds
27:        );
28:
29:    // Obtain a PartialResultSet for each DocumentStoreManager
30:    // specified by the Query. A PartialResultSet is a lightweight
31:    // set of results that contain the top N results from the
32:    // DocumentStoreManager it was run on (see below for the
33:    // expanded method "queryRunner.runQuery")
34:    PartialResultSet[ ] partialResultSets = queryRunner.runQuery(
35:        distributedQuery,
36:        distributedQueryParams,
37:        bayesCalculationsData,
38:        queryDocumentStoreManagerIds
39:    );
40:
41:    // Combine the PartialResultSets into one ResultSet. This
42:    // process also obtains the document paragraphs for each result
43:    // document, as specified by the user
44:    ResultSet resultSet = ResultSetFactory.getResultSet(
45:        partialResultSets,
46:        queryParams
47:    );
48:
49:    // return the query results
50:    return resultSet;
51: }
52:
53: //-----------------------------------------------------------------
54: // The QueryRunner class contains a number of executable threads for
55: // getting BayesCalculationsData objects from multiple
56: // DocumentStores simultaneously ver the OmniQ network.
57: //-----------------------------------------------------------------
58: QueryRunner:getBayesCalculationsData
59: {
60:    // loop over all DocumentStoreManagers - each termStatFetch will
61:    // obtain BayesCalculationsData from a given
62:    // DocumentStoreManager, and if required, using the
63:    // termStatsCache to avoid making a network call to the
64:        DocumentStoreManager
65:    for (int i = 0; i < count; i++) {
66:        _termStatFetches[i].runAt(allDocumentStoreManagerIds[i]);
67:    }
68:    // Wait for all the termStatFetches to finish
69:    waitForFetches( );
70:
71:    // get the BayesCalculationsData from each termStatFetch
72:    BayesCalculationsData[ ] bayesCalcDatas =
73:        new BayesCalculationsData[count];
74:    for (int i = 0; i < count; i++) {
75:        bayesCalcDatas[i] = _termStatFetches[i].bayesCalcData;
76:    }
77:
78:    // combine each BayesCalculationsData object returned from
79:    // each termStatFetch into one BayesCalculationsData object
80:    // and return the data.
81:    return BayesUtils.combineBayesCalculationsDatas(bayesCalcDatas);
82: }
83:
84: //-----------------------------------------------------------------
85: // The QueryRunner class contains a number of executable threads for
86: // running a DistributedQuery on multiple DocumentStores
87: // simultaneously over the OmniQ network.
```

-continued

```
88: //----------------------------------------------------------------
89: QueryRunner:runQuery
90: {
91:     // loop over each DocumentStoreManager the query is specified
92:     // to run on
93:     for (int i = 0; i < count; i++) {
94:         __resultsFetches[i].runAt(queryDocumentStoreManagerIds[i]);
95:     }
96:
97:     // Wait for all the resultsFetches to finish
98:     waitForFetches( );
99:
100:    // get the PartialResultSet from each resultsFetch
101:    PartialResultSet[ ] partialResultSets =
            new PartialResultSet[count];
102:    for (int i = 0; i < count; i++) {
103:        partialResultSets[i] = __resultsFetches[i].resultSet;
104:    }
105:
106:    // return the array of PartialResultSets, one for each
107:    // DocumentStoreManager the query was run on
108:    return partialResultSets
109: }
110:
```

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. An improved method which operates in a computer system comprising a central server and one or more remote servers and which performs distributed query processing, the method comprising:
   receiving at the central server a search request specifying one or more terms for retrieving documents;
   at each remote server where documents have been indexed, generating local Bayes calculation data for each term on that server;
   at the central server, generating global Bayes calculation data by combining the local Bayes calculation data from each remote server, and allowing the remote servers to accurately score and rank documents as if they were all located on one server on a per query basis;
   sending the global Bayes calculation data to each remote server as part of the distributed query processing;
   at each remote server, producing a list of matching documents sorted by relevance ranking by performing a local Bayesian query calculation based at least in part on said global Bayes calculation data; and
   at the central server, generating a final list of most relevant documents by merging the lists of matching relevant documents from each remote server, each document having an accurate score calculated from the local calculation data and global Bayesian statistics on a per query basis.

2. The method of claim 1, wherein said search request comprises a natural language text query entered by a user.

3. The method of claim 2, further comprising breaking down the natural language text into individual query terms.

4. The method of claim 1, wherein said step of generating local Bayes calculation data for each term includes:
   making a light weight request from the central server to each remote server where documents have been indexed, to obtain local Bayes calculation data for each term on that remote server.

5. The method of claim 4, wherein said local Bayes calculation data includes, for a given term and a given remote server, how many documents on the given remote server contain the given term.

6. The method of claim 5, wherein said local Bayes calculation data also includes a total frequency of the given term in all documents on the given remote server.

7. The method of claim 5, wherein said local Bayes calculation data also includes how many documents are indexed on the given remote server.

8. The method of claim 5, wherein said local Bayes calculation data also indicates an average document length of all documents on the given remote server.

9. The method of claim 1, further comprising:
   caching the generated global Bayes calculation data, so as to aid similar queries.

10. The method of claim 1, wherein the final list represents a final set sorted based on relevance to the search request.

11. The method of claim 1, further comprising:
    storing on a computer-readable medium processor-executable instructions for performing the method.

12. An information retrieval system comprising:
    a central hub and one or more remote document stores;
    a module, operating at the central hub, for receiving a search request specifying one or more terms for retrieving documents;
    a module, operating at remote document stores, for generating local Bayes calculation data for each term for documents indexed at that document store;
    a module, operating at the central hub, for generating global Bayes calculation data by combining the local Bayes calculation data from each remote document store, and sending the global Bayes calculation data back to each remote document store, and allowing the remote document stores to accurately score and rank documents as if they were all located on one document store on a per query basis;
    a module, operating at remote document stores, for producing a list of matching documents sorted by relevance ranking by performing a local Bayesian query calculation based at least in part on said global Bayes calculation data; and
    a module, operating at the central hub, for generating a final list of most relevant documents by merging the lists of matching relevant documents from each remote document store, each document having an accurate score calculated from the local calculation data and global Bayesian statistics on a per query basis.

13. The system of claim 12, wherein said search request comprises a natural language text query entered by a user.

14. The system of claim 13, further comprising breaking down the natural language text into individual query terms.

15. The system of claim 12, wherein said module for generating local Bayes calculation data for each term comprises:
    a module for making a light weight request from the central hub to each remote document store where documents have been indexed, to obtain local Bayes calculation data for each term on that remote document store.

16. The system of claim 15, wherein said local Bayes calculation data includes, for a given term and a given remote document store, how many documents on the given remote document store contain the given term.

17. The system of claim 16, wherein said local Bayes calculation data also includes a total frequency of the given term in all documents on the given remote document store.

18. The system of claim 16, wherein said local Bayes calculation data also includes how many documents are indexed on the given remote document store.

19. The system of claim 16, wherein said local Bayes calculation data also indicates an average document length of all documents on the given remote document store.

20. The system of claim 12, further comprising:
a module, operating at the central hub, for caching the generated global Bayes calculation data, so as to aid similar queries.

21. The system of claim 12, wherein the final list represents a final set sorted based on relevance to the search request.

22. An improved method for performing distributed Bayesian query processing, the method comprising:
receiving at a first computer a search request for retrieving documents pursuant to one or more search terms;
based on said search request, sending a lightweight request to other computers where documents have been indexed, for determining local Bayes calculation data for each term on each of the other computers;
generating at the first computer global Bayes calculation data by combining the local Bayes calculation data from each of the other computers;
sending the global Bayes calculation data to each of the other computers as part of the distributed Bayesian query processing;
at each of the other computers, producing a list of matching documents sorted by relevance ranking, by performing a local Bayesian query calculation that takes into account said global Bayes calculation data, and allowing the other computers to accurately score and rank documents as if they were all located on one server computer on a per query basis; and
generating at the first computer a final list of most relevant documents by merging the lists of matching relevant documents from each of the other computers, each document having an accurate score calculated from the local calculation data and global Bayesian statistics on a per query basis.

23. The method of claim 22, wherein said local Bayes calculation data includes, for a given term and a given one of the other computers, how many documents on the given one of the other computers contain the given term.

24. The method of claim 23, wherein said local Bayes calculation data also includes a total frequency of the given term in all documents on the given one of the other computers.

25. The method of claim 23, wherein said local Bayes calculation data also includes how many documents are indexed on the given one of the other computers.

26. The method of claim 23, wherein said local Bayes calculation data also indicates an average document length of all documents on the given one of the other computers.

27. The method of claim 22, further comprising:
caching the generated global Bayes calculation data, so as to aid similar queries.

28. The method of claim 22, wherein the final list represents a final set sorted based on relevance to the search request.

29. The method of claim 22, wherein the first computer is configured as a hub for sending data to the other computers efficiently.

30. The method of claim 22, further comprising:
storing on a computer-readable medium processor-executable instructions for performing the method.

* * * * *